May 23, 1939.  H. T. PLATZ  2,159,860
WELDING EQUIPMENT
Filed May 23, 1938  7 Sheets-Sheet 1
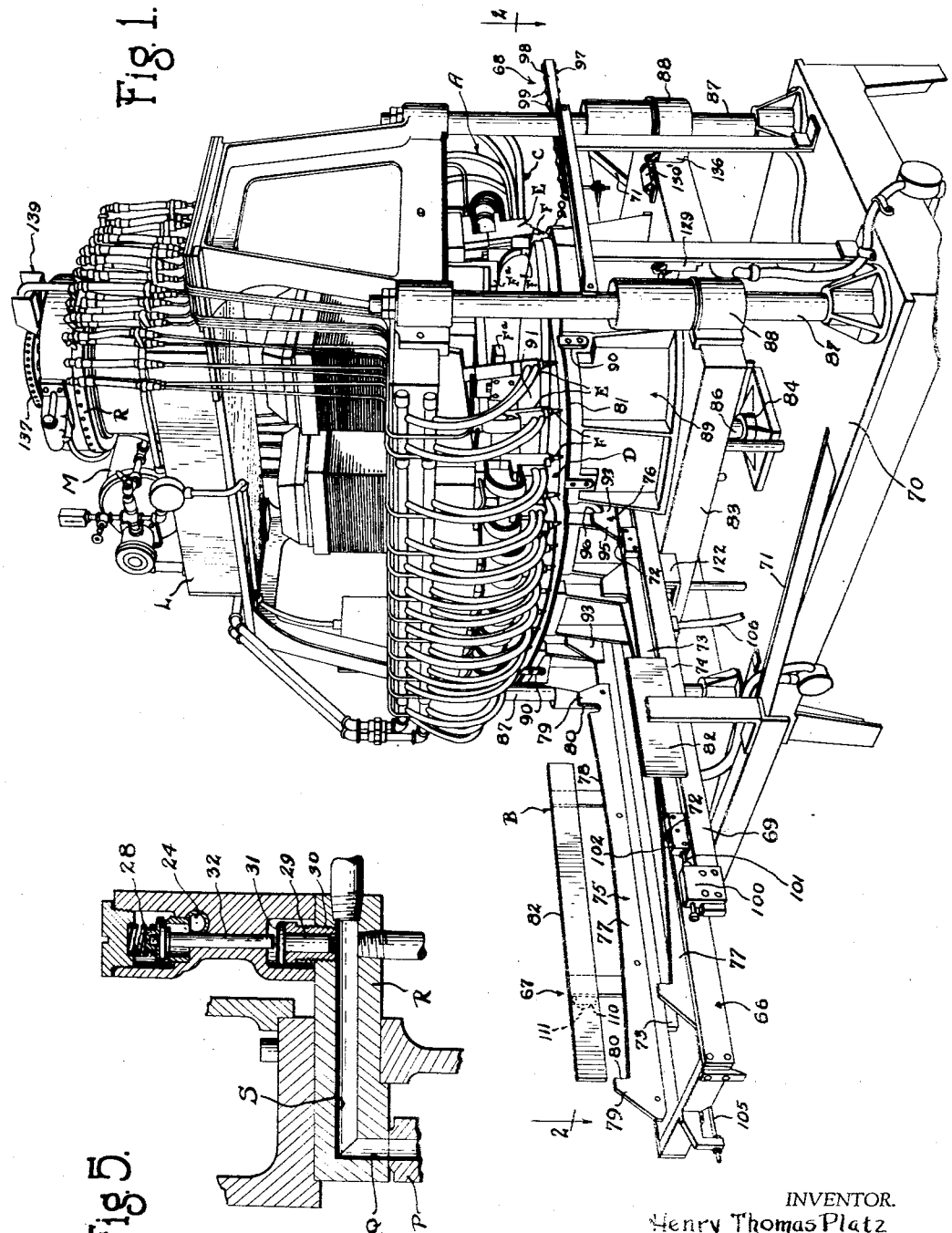
INVENTOR.
Henry Thomas Platz
BY
ATTORNEYS

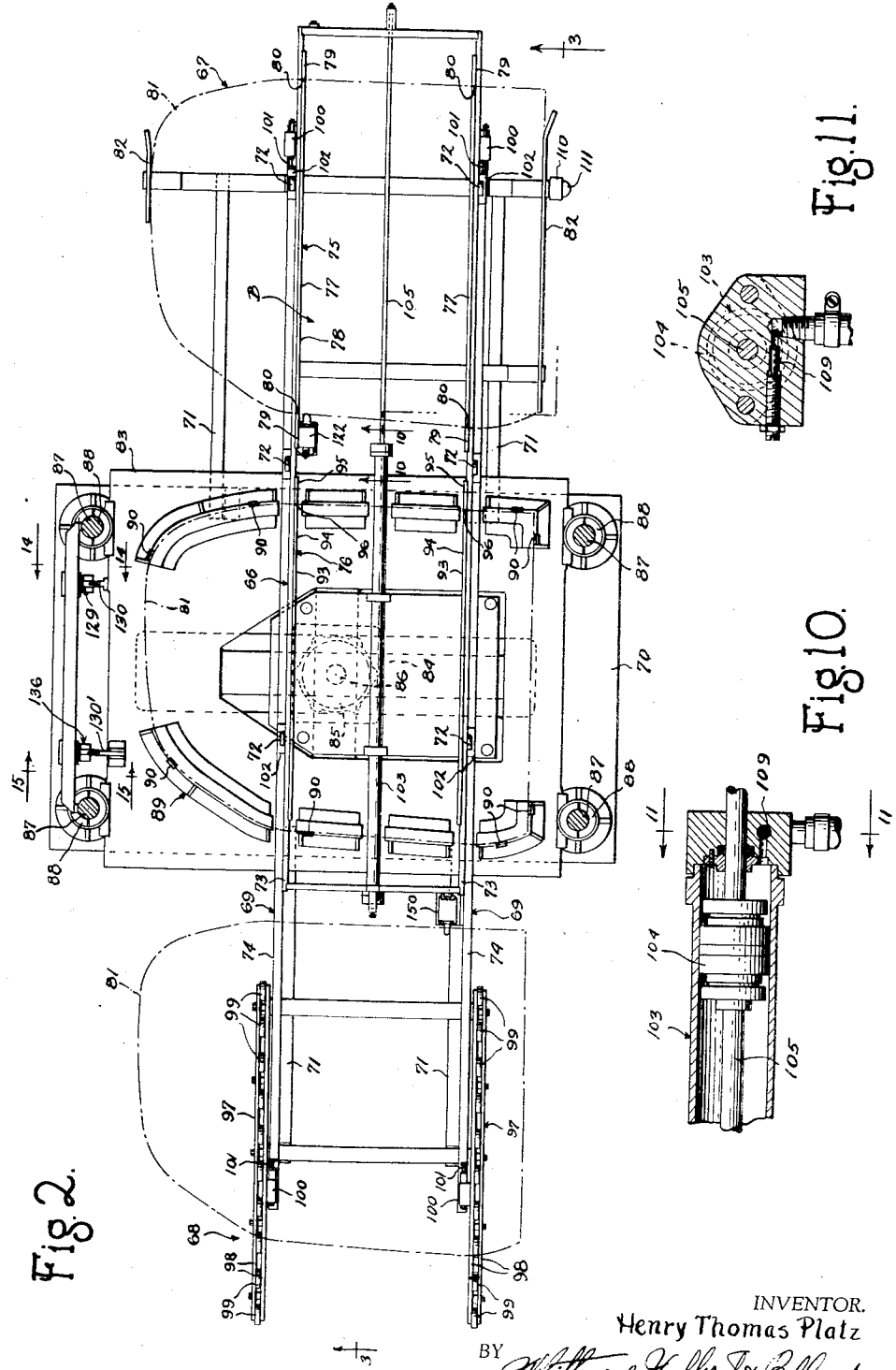

May 23, 1939.    H. T. PLATZ    2,159,860
WELDING EQUIPMENT
Filed May 23, 1938    7 Sheets-Sheet 3
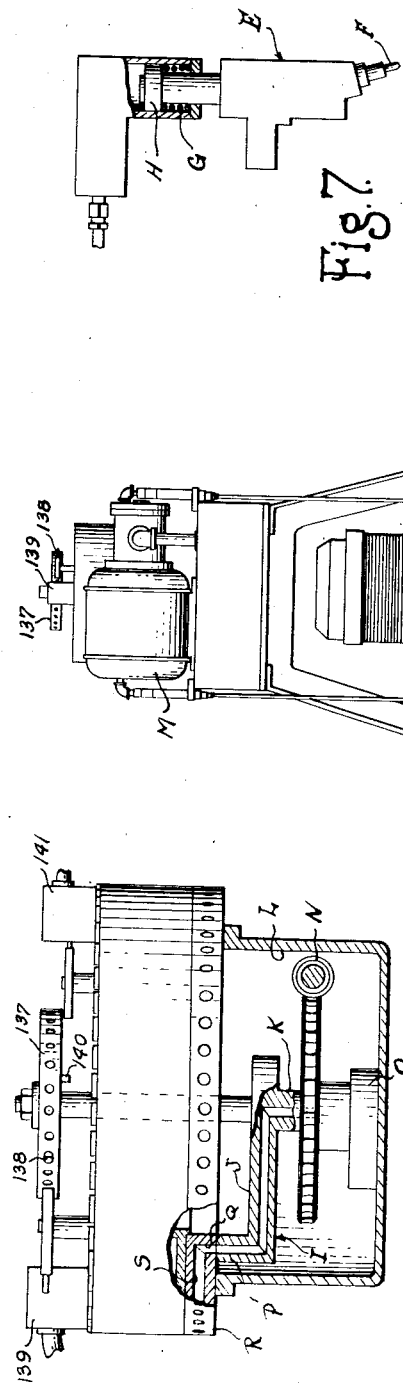
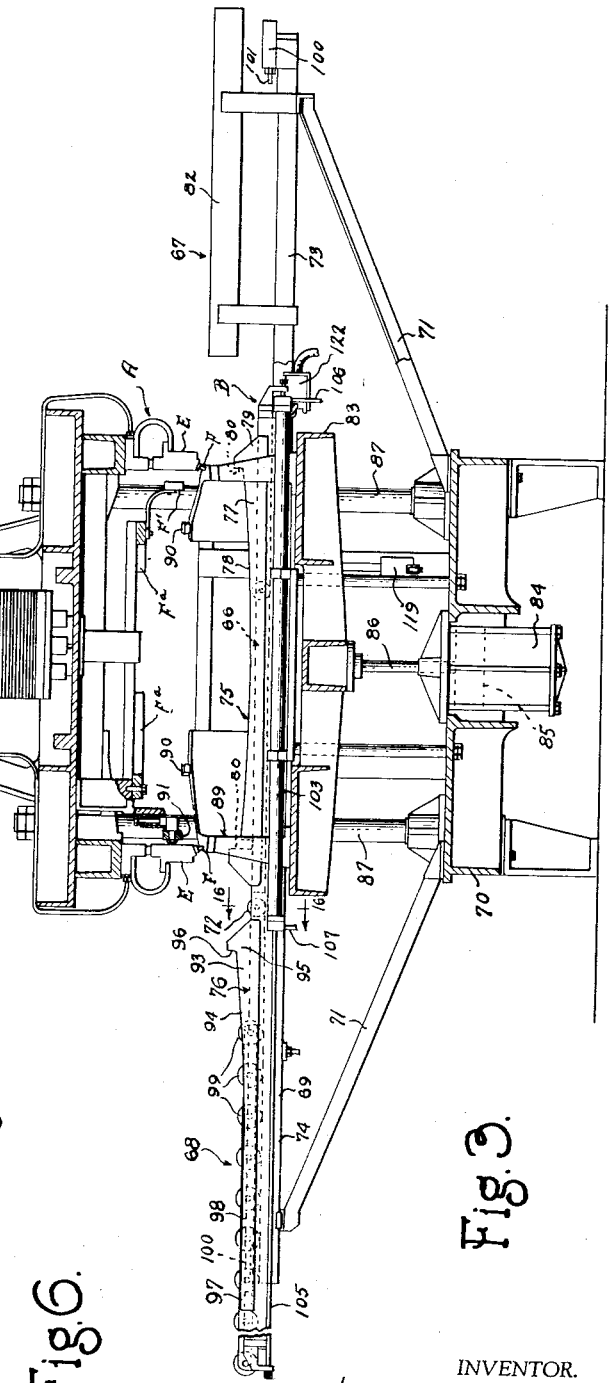
INVENTOR.
Henry Thomas Platz
BY
ATTORNEY.S May 23, 1939.    H. T. PLATZ    2,159,860
WELDING EQUIPMENT
Filed May 23, 1938    7 Sheets-Sheet 4

INVENTOR.
Henry Thomas Platz
BY
ATTORNEY.S

May 23, 1939.  H. T. PLATZ  2,159,860
WELDING EQUIPMENT
Filed May 23, 1938  7 Sheets-Sheet 5
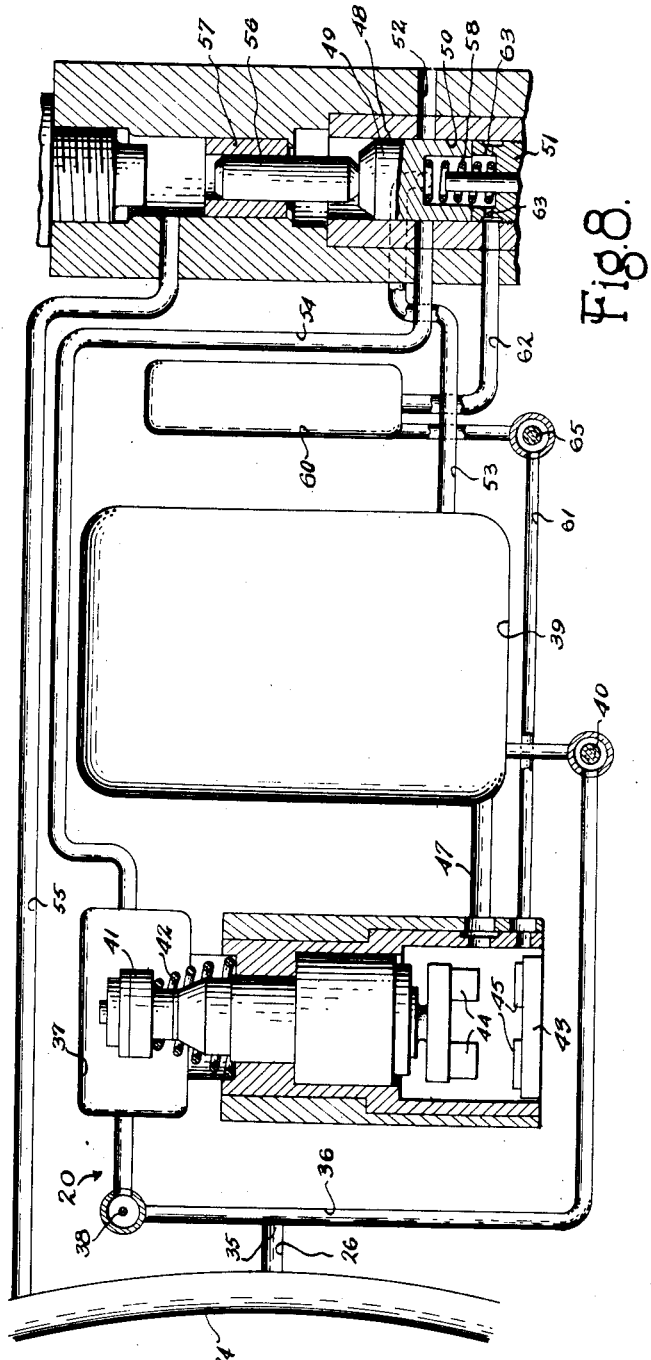
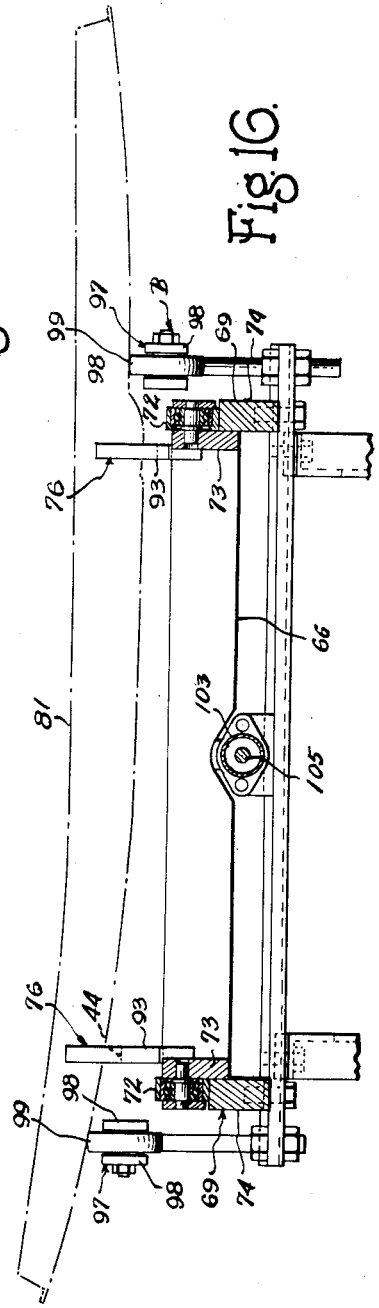
INVENTOR.
Henry Thomas Platz
BY
ATTORNEYS May 23, 1939.   H. T. PLATZ   2,159,860
WELDING EQUIPMENT
Filed May 23, 1938   7 Sheets-Sheet 6

INVENTOR.
Henry Thomas Platz
BY
ATTORNEYS.

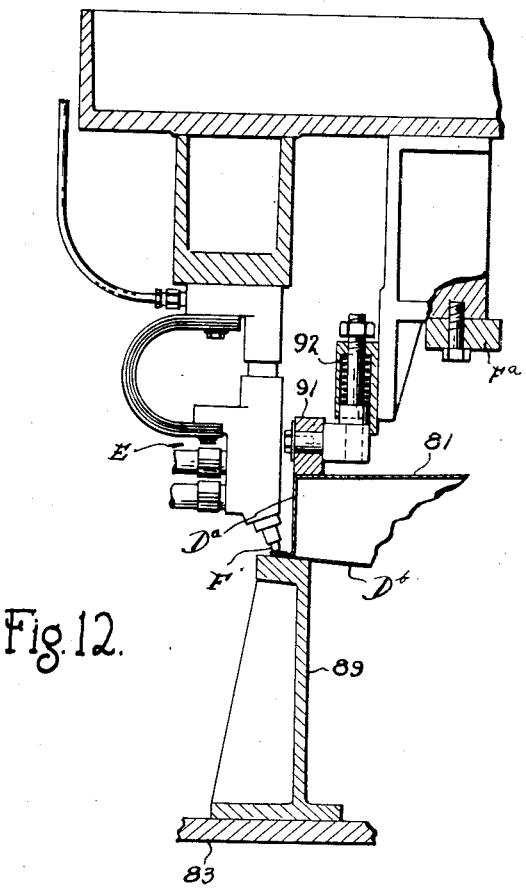
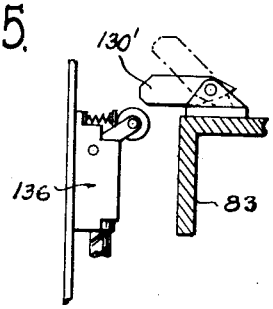
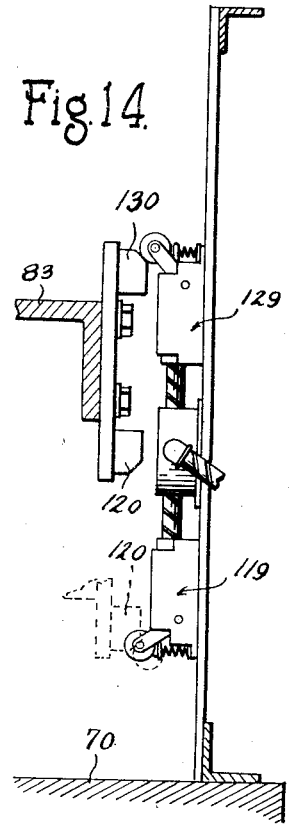
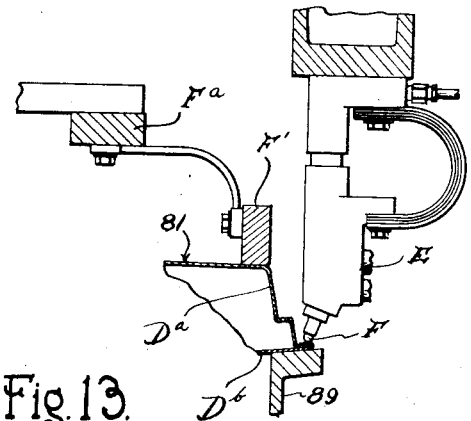

Patented May 23, 1939

2,159,860

UNITED STATES PATENT OFFICE 2,159,860

WELDING EQUIPMENT

Henry Thomas Platz, Detroit, Mich., assignor to Briggs Manufacturing Company, Detroit, Mich., a corporation of Michigan Application May 23, 1938, Serial No. 209,592

20 Claims. (Cl. 219—4)

This invention relates generally to welding equipment and refers more particularly to apparatus for effecting a plurality of welds automatically.

One of the principal objects of this invention is to simplify, render more efficient and improve generally the art of welding by providing welding apparatus which not only expediently performs the several operations required to complete a welding cycle but, in addition, performs these operations automatically in their proper sequence.

Another object of this invention resides in the provision of welding apparatus having a reciprocable carriage movable in predetermined timed relation to the operation of the welding devices to locate the work to be welded into registration with the welders and to simultaneously move the completed work out of the apparatus. In accordance with this invention, the work to be welded is positioned on the carriage at one side of the apparatus and the carriage is advanced toward the opposite side of the apparatus to not only position the work to be welded into registration with the welders but, in addition, to move the work previously welded to an unloading station at the latter side of the apparatus.

Still another feature of this invention consists in the provision of means operating in timed relation to movement of the carriage to position the work in registration with the welders to lift the work off the carriage into operative relation to the welding devices and to return the carriage to its loading station where another work piece may be placed on the carriage during the interval the work in registration with the welding devices is being welded.

A further object of this invention consists in providing means operating in timed relation to completion of the welding cycle to lower the work on the carriage and effect the aforesaid movement of the carriage to not only introduce the new work to the welding devices, but to also move the completed work to the unloading station where it is removed from the carriage prior to return movement of the latter to its loading position.

A still further advantageous feature of this invention consists in the provision of means operating in timed relation to lifting the work into operative relation to the welders to automatically effect one complete cycle of operation of the welders.

In addition to the foregoing, the present invention contemplates apparatus for effecting each of the following operations in predetermined timed relationship: (a) Movement of the carriage from one side of the apparatus to advance work to be welded into registration with the welders; (b) Lifting the work off the carriage into operative relation to the welding devices; (c) Returning the carriage to the loading station for reloading; (d) Lowering the work on to the carriage upon completion of the welding cycle; (e) Again moving the carriage in the direction mentioned under item (a) to simultaneously move the new work into registration with the welders and the completed work to the unloading station where it is removed from the carriage.

The foregoing, as well as other objects, will be made more apparent as this description proceeds, especially when considered in connection with the accompanying drawings, wherein:

Figure 1 is a perspective view of welding apparatus constructed in accordance with this invention;

Figure 2 is a sectional plan view taken substantially on the plane indicated by the line 2—2 of Figure 1;

Figure 3 is a sectional view taken substantially on the plane indicated by the line 3—3 of Figure 2;

Figure 5 is a sectional view taken on the line 5—5 of Figure 4;

Figure 6 is a semi-diagrammatic vertical sectional view through the welding unit;

Figure 7 is a semi-diagrammatic elevational view, partly in section, of one of the welders;

Figure 8 is a diagrammatic view of one of the switches;

Figure 10 is a sectional view taken on the line 10—10 of Figure 2;

Figure 11 is a sectional view taken on the line 11—11 of Figure 10;

Figure 12 is an enlarged sectional view showing one of the welders in operative relation to the work;

Figure 13 is a detail sectional view of a portion of the machine shown in Figure 3 illustrating the two electrodes in operative relation to the work;

Figure 14 is a sectional view taken on the line 14—14 of Figure 2;

Figure 15 is a sectional view taken on the line 15—15 of Figure 2; and

Figure 16 is a cross sectional view taken on the line 16—16 of Figure 3.

Figure 4:
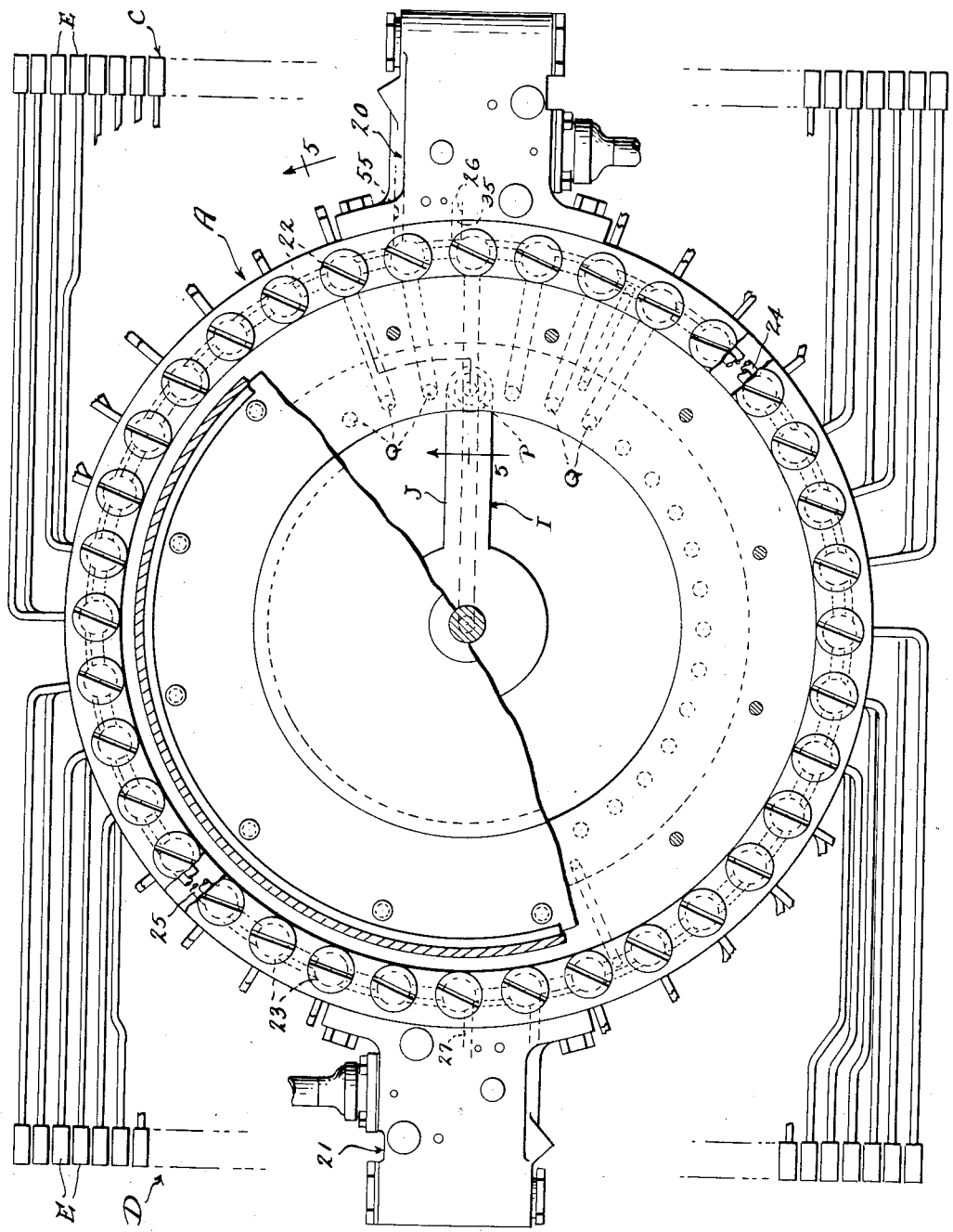
Figure 4 is a plan view of the welding unit.
Figure 9:
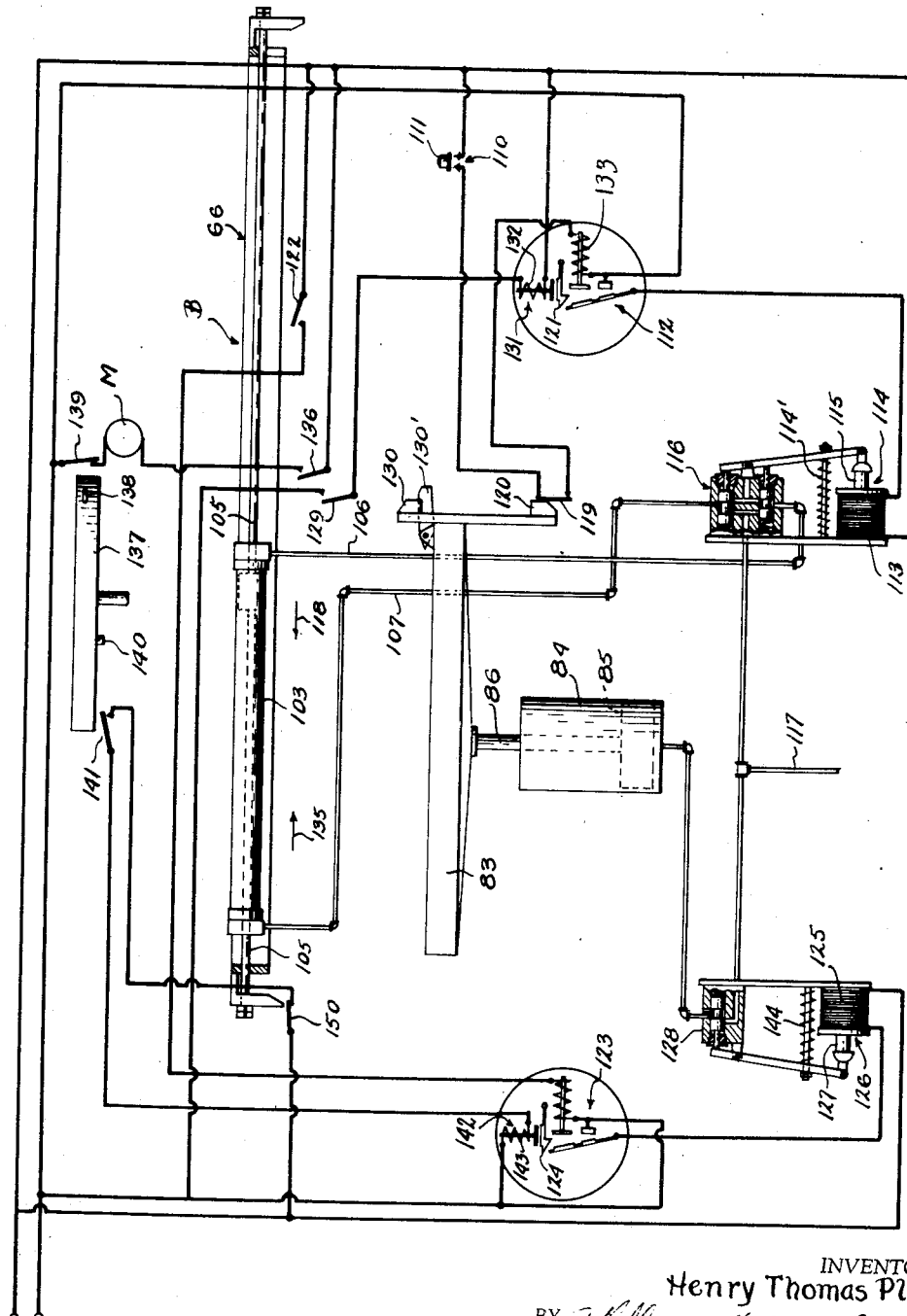
Figure 9 is a diagram of the operation of the apparatus.

The apparatus forming the subject matter of this invention may be considered as comprising generally two units, a welding unit A and a work handling unit B. While in the illustrated embodiment of this invention both units are operated in conjunction with one another, nevertheless, it is to be understood that neither unit is necessarily limited in its use with the other. In other words, the handling unit may be advantageously employed in connection with various different types of welding units and, of course, the welding unit illustrated may be used wherever it is desirable to expediently perform a series of welds. In this connection, it may be pointed out that the welding unit selected for the purpose of illustrating this invention is shown and described in detail in my copending application Serial No. 210,233, filed May 26, 1938.

Briefly described, the welding unit comprises two banks of welders C and D, each bank having a plurality of groups of welders E provided with electrodes F movable toward and away from the work. The groups E of welders in each bank are successively operated in a manner such that the electrodes F of the welders in each group are simultaneously moved by fluid pressure into clamping engagement with the work and are returned to their inoperative positions by means of the springs G acting on the undersides of the electrode operating pistons H in the manner clearly shown in Figure 7 of the drawings.

In the specific embodiment of the invention selected for the purpose of illustration, the apparatus is designed to weld the marginal edges of an inner vehicle door panel $D^a$ to the marginal edges of the outer panel $D^b$ of the door. In Figure 13 of the electrodes F are shown as engaging the free marginal edge of the return-bent flange on the outer door panel and the cooperating electrode F' is illustrated as abutting the inner door panel adjacent the marginal edge of the latter which extends into the return-bent flange on the outer door panel. The electrode F' is electrically connected to a bus bar $F^a$ which in turn is connected in the welding circuit with the electrodes F, according to orthodox practice, with the result that current flows through the return-bent flange of the outer door panel to the interfitting marginal flange of the inner door panel and, in this manner, integrally connects the same together.

Upon reference to Figure 6, it will be noted that hydraulic fluid medium under pressure is successively supplied to the groups E of welders in both banks by a distributing valve I having an arm J provided with a fluid passage therethrough and secured at the inner end to the upper end of a vertically extending hollow shaft K with the passage through the arm communicating with the passage through the shaft. The shaft K is journalled in a reservoir L containing the hydraulic fluid medium and is driven by an electric motor M through suitable reduction gearing N. A pump O is supported in the reservoir below the level of the hydraulic fluid medium and is adapted to supply fluid under pressure to the communicating passages in the shaft K and arm J. A nozzle P is secured to the radially outer end of the arm in communication with the passage therethrough and successively registers with circumferentially spaced ports Q formed in the underside of the distributing plate R.

Each of the ports Q in the plate R communicates with the inner end of a radially outwardly extending passage S in the plate R, and the outer end of each passage S communicates with the cylinders of the welders of one group E at a point above the electrode operating pistons H through the medium of flexible conduits.

From the foregoing, it will be noted that fluid pressure successively supplied to each of the passages S by the nozzle P is discharged from each passage S into the pressure cylinders of the associated group of welders at points above the electrode operating pistons H in the pressure cylinders. As a result, the pistons H are moved against the action of the springs G in a downward direction to effect movement of the electrodes F into clamping engagement with the stock to be welded. Thus, it will be seen that the electrodes F of the welders in each group E are simultaneously moved into engagement with the work as the groups of welders in both banks are successively connected to the nozzle P of the distributing valve I. The fluid under pressure is continuously supplied to each group of welders until the nozzle P is moved by the arm J out of registration with the associated port Q. At this time, the port Q is opened to the interior of the reservoir L and the pressure on the fluid in the associated group of welders immediately drops to such an extent as to permit the electrodes F to be moved away from the work by the springs G.

For the purpose of illustration, all of the the welders in the group C are arranged in an electric circuit controlled by the switch 20 and all of the welders in the group D are arranged in another electric circuit controlled by a switch 21. Both of the switches are identical in construction and operate automatically by fluid pressure to close and open their respective circuits in timed relation to movement of the electrodes into and out of engagement with the work. Although the two switches are identical in construction, nevertheless, they may be independently adjusted so that the welding time of the welders in the bank C may either be the same or different from the welding time of the welders in the bank D. For example, in cases where both welders operate on stock having the same characteristics and thicknesses, both switches may be operated in unison so that the welding time of all of the welders in both banks is the same. However, if the welders in the bank D are adapted to operate on stock having a thickness less than the stock upon which the welders in the bank C operate, the switch 21 is adjusted so that the welders in the bank D have a shorter welding time than the welders in the bank C. In either case, however, the switches operate to close their respective circuits after the electrodes are moved into engagement with the work and to open the circuits before the electrodes are retracted from the work.

As stated above, the switches are automatically operated by fluid under pressure in timed relation to movement of the electrodes F into and out of engagement with the work. In the present instance, each switch is operated by air under pressure and, in general, the flow of air to the switch 20 is controlled by a plurality of valves 22, while the flow of air under pressure to the switch 21 is controlled by a similar series of valves 23. The number of valves 22 corresponds to the number of groups E of welders in the bank C, and the number of valves 23 corresponds to the number of groups E of welders in the bank D. The valves are successively operated by the distributing valve I to open communication between the source of air under pressure and the interior of the switches at the same time that the electrodes of the groups of welders are moved into engagement with the work. The arrangement is such that when the electrodes of one group E of welders in the bank C are relatively moved into engagement with the stock by the hydraulic fluid under pressure supplied by the distributing valve I, the air valve 22 associated with this group of welders is automatically opened to allow the passage of air into the switch 20 controlling the welding circuit to the above mentioned group of welders in the bank C. It, of course, follows from the above that when one group of welders in the bank D is relatively moved into engagement with the stock by the hydraulic fluid under pressure supplied to the distributing valve I, the air valve 23 associated with this group of welders is automatically opened to determine the passage of air into the switch 21 controlling the welding circuit to the groups of welders in the Bank D.

It will also be understood that independent air supply lines 24 and 25 are provided for the switches 20 and 21, respectively. The air supply line 24 is adapted to communicate with the switch 20 through an air distributing line 26 when any one of the valves 22 is opened and the air supply line 25 communicates with the switch 21 through the air distributing line 27 when any one of the valves 23 is opened.

Each of the valves is urged to its closed position by means of a spring 28 and the valves are successively moved to their open positions against the action of the springs by means of the hydraulic fluid under pressure supplied to the welders by the distributing valve I. For accomplishing this result, each valve is provided with a follower 29 slidably mounted in a bushing 30 and having a head 31 seated on the upper end of the bushing directly beneath the stem 32 of each valve. The bushings 30 are threaded in the top surface of the distributing plate R in a position so determined that one bushing communicates with each fluid pressure passage S in the plate R. As a result, the lower ends of the followers are exposed to the hydraulic fluid under pressure in the passages S, and these followers are moved upwardly by the fluid pressure in the latter passages to, in turn, effect an upward movement of the valves.

*Fluid pressure operated switches 20 and 21*

Although the admission of air under pressure to the switches 20 and 21 is controlled by the distributing valve I in a manner that the air is admitted to one or the other of the switches at the same time the electrodes of one group E of welders are moved into engagement with the work by the distributing valve I, nevertheless, the actual operation of the switches to close and open the circuit to the group of welders being operated by the distributing valve I is controlled independently of the movement of the electrodes into engagement with the work. With this arrangement, the duration of the welds may be accurately varied within definite limits even though the time interval that the electrodes of the several groups of welders are maintained into engagement with the work is uniform.

Inasmuch as the construction and operation of both switches are identical, a description of the switch 20 will suffice for both switches. The switch 20 is diagrammatically shown in Figure 8 of the drawings, and it is believed that the operation of this switch will be readily understood upon considering this figure in connection with the following description. When any one of the valves 22 associated with the bank C of welders is opened, air under pressure flows from the supply line 24 to the distributing line 26 and is discharged into the switch 20 through a port 35. The air under pressure flowing through the port 35 is discharged into a passage 36 having one end communicating with the switch chamber 37 through the medium of a restricted port 38 and having the opposite end communicating with an accumulating chamber 39 through the medium of a metering valve 40. The air under pressure in the switch chamber 37 acts upon the plunger 41 in the chamber and, when this air pressure exceeds the force exerted by the spring 42, the plunger 41 is moved against the action of this spring in a direction toward the stationary contact member 43 to engage the contacts 44 on the plunger 41 with the contacts 45 on the fixed member 43. It will, of course, be understood that the contacts are insulated from one another and that the cooperating contacts of each pair are electrically connected in opposite sides of the welding circuit in a manner to close the primary circuit to the welder or group of welders when the switch plunger 41 is moved by air under pressure to effect engagement of the cooperating contacts. As stated above, the flow of fluid under pressure into the chamber 37 is restricted by the port 38, and the extent of this restriction is so determined that closing of the switch 20 is delayed until the electrodes of the welder or group of welders are moved into engagement with the work.

The air under pressure also builds up in the accumulating chamber 39 at a rate determined by the adjustment of the needle valve 40, and this air under pressure is discharged into the switch chamber 37 between the movable and stationary contact carrying members 41 and 43 through the medium of a passage 47. When the pressure of the air between the contact carrying members approximates the air pressure acting on the opposite side of the movable contact member 41, the latter is moved to its free position by the spring 42, with the result that the circuit to the electrodes is opened. It follows from the above that the time interval of opening of the switch or the duration of the weld may be accurately controlled by adjusting the needle valve 40. In any case, however, the needle valve 40 is so adjusted that the switch 20 will open the welding circuit before the electrodes are moved out of engagement with the work.

Inasmuch as the switch 20 is employed to control all of the welders in the bank C, the rate of operation of the several groups of welders in this bank depends to some extent upon the rapidity with which the switch 20 can be operated. For this reason, provision is made herein for quickly exhausting the air under pressure from the accumulating chamber 39 and switch chamber 37 after each operation of the switch.

Referring again to Figure 8 of the drawings, it will be noted that exhausting the switch 20 is effected by an exhaust valve 48 housed in the switch casing. The exhaust valve 48 comprises a valve plunger 49 reciprocably mounted in a bore 50 normally urged into seating engagement with the inner end of a plug 51 having a portion threaded into one end of the bore 50. When in this position, the valve plunger 49 seals or closes the exhaust opening 52 formed in the switch casing to establish communication between the interior of the bore 50 and the atmosphere. The interior of the bore 50 also communicates at points spaced circumferentially from the exhaust port 52 with the accumulating chamber 39 and the switch chamber 37. As shown in Figure 8, the accumulating chamber 39 communicates with the interior of the bore through the medium of a passage 53 and the switch chamber 37 communicates with the interior of the bore 50 through the medium of a passage 54. The discharge ends of the passages 53 and 54 communicate with the bore 50 in such a manner that when the plunger 49 is in its normal position shown in Figure 8, these passages, as well as the exhaust port 52, are closed by the valve plunger.

It follows from the above that the valve plunger 49 must be moved in a direction away from the plug 51 in order to establish communication between the exhaust port 52 and the passages 53 and 54. Movement of the exhaust valve plunger 49 in the above mentioned direction is resisted by means of the air pressure from the distributing line 26 which communicates with the bore 50 through the medium of a passage 55. The air under pressure supplied to the bore 50 acts upon one of a pin 56 slidably mounted axially of the bore 50 in a bushing 57 and having the opposite end abutting the valve plunger 49. The pressure of the air discharged into the bore 50 through the passage 55 is greater than the force of the spring 58 acting upon the valve plunger 49 tending to move the same against the action of the air under pressure.

It follows from the above that the air from the distributing line 26 maintains the exhaust valve closed against the action of the spring 58 until the force exerted by the latter is supplemented with an additional force sufficient to overcome the pressure of the air on the pin 56. As shown in Figure 8, this additional force is supplied by air pressure built up in a second accumulating chamber 60 by means of a passage 61 and communicates with the bore 50 by means of a passage 62. The passage 62 communicates with the bore 50 at a point beyond the end of the plunger 49 acted upon by the spring 58 and, in the present instance, the plug 51 is formed with a series of passages 63 therethrough to provide for the flow of air against the side of the plunger 49 acted upon by the spring 58. As a result of the above, the air pressure supplied to the bore 50 from the accumulating chamber 60 supplements the action of the spring 58 to move the valve plunger 49 against the action of the fluid pressure acting on the pin 56 and to open communication between the exhaust port 52 and the passages 53 and 54. It may be pointed out at this time that the diameter of the pin 56 is substantially less than the diameter of the valve plunger 49, with the result that the area exposed to the air pressure entering the bore 50 from the passage 55, tending to hold the valve plunger in a position wherein the exhaust port 52 is closed, is less than the area of the valve plunger exposed to the action of the fluid pressure admitted to the bore 50 from the accumulating chamber 60.

As soon as the valve plunger 49 is moved away from the plug 51 by the combined effort of the spring 58 and the air pressure supplied by the accumulating chamber 60, the exhaust port 52 is connected to the passages 53 and 54 with the result that the switch is immediately exhausted to the atmosphere. The time interval of operation of the exhaust valve to exhaust the switch depends upon the rate at which pressure builds up in the accumulating chamber 60 and this rate is controlled by a metering valve 65 similar to the metering valve 40 and located in the passage 61 between the accumulating chamber 39 and the accumulating chamber 60. The metering valve 65 is accurately adjusted to delay operation of the exhaust valve until the welding circuit has been opened by movement of the switch plunger 41 in a direction away from the fixed contact carrying member 43.

*Work handling unit B*

The work handling unit B comprises a rectangular carriage 66 mounted for reciprocation in a horizontal plane beneath the welding unit A between a loading station 67 and an unloading station 68. The carriage 66 is slidably mounted on a track 69 supported from the base 70 of the machine by means of diagonal braces 71 having the inner ends fixedly secured to the base 70 and having the outer ends secured to the track. Upon reference to Figure 2, it will be noted that a plurality of rollers 72 are secured to each side bar 73 of the carriage in spaced relation to each other longitudinally of the side bars and adapted to engage the top surfaces of the side bars 74 of the track 69. The width of the carriage 66 and the depth of the side bars 73 thereof are predetermined to provide for frictional engagement of the outer side surfaces of the bars 73 adjacent the bottom longitudinal edges thereof with the inner surfaces of the side bars 74 of the track 69. As a result, lateral displacement of the carriage 66 relative to the track is prevented.

Mounted on the carriage for movement as a unit therewith is a pair of work supports, designated generally in the several figures by the reference characters 75 and 76. The work support 75 comprises a pair of members 77 respectively secured to the opposite side bars 73 of the carriage and having top surfaces 78 extending above the side bars of the carriage to form a rest upon which the work is positioned. Each of the members 77 is formed with upwardly extending flanges 79 at opposite ends providing shoulders 80 engageable with opposite sides of the work for moving the work as a unit with the carriage.

When the carriage is in the extreme position shown in Figures 1 and 2, the work support 75 is located at the loading station 67 and the work to be welded is placed on the work support 75. As stated above, the machine forming the subject matter of this invention is designed to weld the inner and outer panels of a vehicle body door together. The outline of the door is designated in Figure 2 by the reference character 81 and this door is positioned on the work support 75 transversely of the carriage between the shoulders 80 on the work supporting members 77. The door 81 is positioned laterally with respect to the carriage by means of the guide plates 82 fixedly secured to the track 69 at opposite sides of the carriage. The guide plates 82 are predeterminedly located with respect to the welders so that the proper portions of the door will register with the electrodes F of the welders when the door is positioned in operative relation to the electrodes.

After the door 81 to be welded has been properly positioned on the carriage 66, the latter is moved to the position shown in Figure 3 wherein the door is in registration with the electrodes F of the welders in the welding unit. The door is then lifted off the work support 75 and moved into operative relationship with the electrodes F of the welders, as shown in Figure 1. This is accomplished by a vertically movable platen 83 supported below the carriage 66 directly beneath the welders for reciprocation toward and away from the welding unit A. Upon reference to Figure 3, it will be noted that the platen 83 is reciprocated by an air cylinder 84 secured to the base 70 of the machine substantially centrally of the latter and having a piston 85 operatively connected to the center of the platen 83 by means of a connecting rod 86. The platen is guided throughout reciprocation thereof by vertical stanchions 87 and bearings 88 secured to the platen in positions to respectively slidably engage the stanchions 87. The lower ends of the stanchions 87 are fixed to the base 70 and the upper ends thereof are secured to the welding unit A for supporting the latter from the base.

Mounted upon the top surface of the platen is a sectional work raising member 89 having the sections thereof predeterminedly spaced from each other to provide for extending the member upwardly between the side bars of the track and carriage. Also, the arrangement and contour of the sections of the member 89 are determined to provide an outline conforming to the outline of the door 81. In this connection, it may be pointed out that the welders associated with the welding unit A are predeterminedly located so that the electrodes F of the welders are arranged on an outline which also corresponds to the outline of the door 81. As a result, upward movement of the member 89 by the platen 83 lifts the door 81 off the carriage 66 into operative relationship to the electrodes F of the welders and movement of the electrodes F to their operative positions serves to clamp the marginal edge portions of the door 81 between the member 89 and the electrodes F. As shown in Figure 13, the electrodes F on the welders E engage the marginal return-bent flange on the outer panel D^b when the door 81 has assumed its uppermost position. It will also be observed from Figure 13 that movement of the door 81 to its upper position by the platen 83 causes the cooperating fixed electrodes F' to engage the inner panel D^a, with the result that a circuit is established through the two panels to the electrodes.

The door 81 is centered on the lifting member or electrode 89 by means of the spaced projections 90 extending upwardly from the various sections of the member 89 and is initially yieldably clamped against the member 89 by means of the clamps 91 shown in Figure 12 as supported on the welding unit A for engagement with the upper surface of the door. The clamps 91 are normally yieldably urged in a direction toward the door by means of the springs 92 which are tensioned when the member 89 is moved to its uppermost position by the platen 83. As will be more fully hereinafter set forth, the welding unit A is operated in timed relation to upward movement of the door 81 to supply an electric current from one electrode F to the cooperating electrode F' through the inner and outer panels of the door to integrally secure the same together.

The carriage 66 is returned to its initial starting position shown in Figure 2 as soon as the door 81 is lifted from the work support 75 by the platen 83. When the carriage is in the above mentioned position shown in Figure 2, the work support 76 assumes a position directly beneath the door 81 which is being welded by the welding unit. The work support 76 also comprises a pair of members 93 respectively secured to opposite sides of the carriage 66 and having a top surface 94 upon which the work is adapted to be supported when the member 89 is lowered from its operative position shown in Figure 3. The ends of the members 93 adjacent the work support 75 are provided with upwardly extending flanges 95 forming shoulders 96 adapted to engage the adjacent side edge of the completed door 81 and to move the door to the unloading station 68 when the carriage 66 is again actuated to position the work support 75 in registration with the welding unit A.

Located at the unloading station 68 is a work support 97 comprising laterally spaced bars 98 secured in any appropriate manner to the adjacent portions of the track 69. A series of rollers 99 are rotatably mounted on each bar 98 in spaced relationship longitudinally of the bars. The elevation of the rollers relative to the elevation at which the completed door 81 is supported by the carriage is predetermined so that when the work support 76 assumes a position at the unloading station 68, the door 81 rides up on the rollers 99. As a result, when the carriage is again returned to its initial starting position shown in Figure 2, the door is left on the rollers and may be removed during the next cycle of operation. Of course, it will be understood that the carriage is not returned to its initial starting position until the new door to be welded has been lifted off the carriage by the platen 83. It may also be pointed out at this time that the carriage is cushioned at each end of its travel by a pair of dashpots 100 respectively secured to opposite ends of the track and having plungers 101 engageable with the mounting brackets 102 for the rollers 72 on the carriage.

The carriage is reciprocated by an air cylinder 103 fixedly supported in any suitable manner on the machine frame and having a piston 104 reciprocably mounted therein. This construction is shown in Figure 10 and, as will be noted from this figure, the piston is secured to the carriage by means of the rod 105. Fluid under pressure is alternately admitted to and exhausted from the cylinder 103 at opposite ends of the piston by means of fluid pressure supply lines 106 and 107, respectively. The rate of flow of fluid under pressure through each of these supply lines to the cylinder is controlled by a needle valve 109 with the result that the rate of movement of the carriage may be varied.

Operation

The operation of the various instrumentalities of the handling unit B and the operation of the welding unit are effected automatically in predetermined timed relationship upon closing the main switch 110 by the operator. The control button 111 for closing the switch 110 is conveniently mounted at the loading station 67 for manipulation by the operator. Manipulation of the push button 111 by the operator closes a circuit to the relay 112 and the latter, in turn, closes a circuit to the coil 113 of an electromagnet 114 having a movable armature 115. Movement of the armature 115 into the magnetic field of the coil 113 operates the valve 116 to open communication between the fluid pressure supply line 117 and cylinder 103 to the passage 106. In addition, operation of the valve 116 by the armature 115 establishes communication between the opposite end of the air cylinder 103 and the atmosphere through the passage 107 to exhaust the fluid pressure on the opposite side of the piston 104. As a result, the piston 104 is moved in the direction of the arrow 118 and the carriage 66 is moved in a corresponding direction to locate the work support 75 in registration with the welding unit A. It may be pointed out in this connection that a limit switch 119 is arranged in series in the circuit with the switch 110 and this switch is normally maintained closed in the lower position of the platen by the projection 120 fixed to the platen. The arrangement is such that when the platen is in any one of its raised positions, the limit switch 119 is open and the switch 110 is rendered inoperative to affect the circuit. Of course, opening of the switch 119 by upward movement of the platen does not deenergize the electromagnet 14 because the relay 112 is latched in its closed position by means of the latch 121.

As the carriage 66 is moved in the direction of the arrow 118, the limit switch 122, mounted on the track 69, is actuated by the carriage to close a circuit to the relay 123 and the latter is immediately latched in its closed position by means of the latch 124. The relay, in turn, closes a circuit to the coil 125 of the electromagnet 126 and movement of the armature 127 into the magnetic field effects operation of the valve 128 to establish communication between the fluid pressure supply line 117 and the lower end of the cylinder 84. Operation of the valve 128 by the electromagnet 126 also closes the exhaust for the cylinder 84 so that the piston 85 in the cylinder is moved upwardly by the air under pressure. Upward movement of the piston 85 effects a corresponding upward movement of the platen 83 to lift the door assembly 81 from the carriage 66 into operative position with the electrodes F and F' of the welders in the welding unit A. As the platen 83 is moved upwardly to lift the door from the carriage, the limit switch 129 on one of the stanchions 87 of the machine is operated by the projection 130 on the platen to close a circuit to the electromagnet 131 associated with the latch 121 of the relay 112. Energization of the coil 132 of the electromagnet 131 sets up a field sufficient to attract the latch member 121 and move the latter in a direction to permit the relay 112 to open. In this connection, it will, of course, be noted that initial upward movement of the platen 83 opens the limit switch 119 so that the switch 119 is rendered inoperative. It will, of course, be understood that the coil 133 of the relay is de-energized as soon as the operator releases his hand from the push button 111. As a consequence, as soon as the latch 121 is operated to release the relay, the circuit to the electromagnet 114 is opened and the valve 116 is actuated by the spring 114' permitting the fluid under pressure in the cylinder 103 to exhaust through the passage 106 and permitting fluid under pressure from the supply line 117 to enter the opposite end of the cylinder through the passage 107. The arrangement is such that the piston 104 in the cylinder 103 is moved in the direction of the arrow 135 to effect a return movement of the carriage 66 to its original starting position. As the platen 83 continues its upward movement, the limit switch 136 is actuated by the projection 130' on the platen to close a circuit to the motor M. It will be remembered that the motor M operates the distributing valve I of the welding unit and effects one complete cycle of operation of the welding unit in the manner clearly defined above. The motor M also operates a contact disc 137 and this contact disc carries a projection 138 predeterminedly arranged to operate a limit switch 139 to open the circuit to the motor M upon completion of the welding operation.

In addition, the contact disc 137 is provided with another projection 140 predeterminedly located to actuate the limit switch 141 to close a circuit to the electromagnet 142 associated with the latch 124. Energization of the coil 143 of the electromagnet 142 attracts the latch 124 and moves the same to its released position. As a result, the electromagnet 126 is de-energized and the valve 128 is operated by the spring 144 to establish communication between the lower end of the cylinder 84 and exhaust. This allows the platen 83 and member 89 to move downwardly to its initial starting position. During the downward movement of the platen, the completed work is positioned on the work support 76 on the carriage in readiness for movement by the carriage to the unloading station when the push button 111 is again manipulated by the operator to insert another door to be welded into the machine. In order to insure maintaining the platen 83 in its uppermost position until the carriage has been moved to locate the work support 76 directly beneath the work, a limit switch 150 may be located in series with the switch 141 and secured to the track 69 in a position to be closed by the work support 76 when the latter has assumed a position directly beneath the completed work.

What I claim as my invention is:

1. In welding apparatus, a plurality of welders having electrodes movable into and out of clamping engagement with the work and arranged in an electric circuit, a work supporting carriage movable from a loading station to a position wherein the work is in registration with the electrodes of the welders, means operated by the carriage in timed relation to movement of the carriage to position the work in registration with the electrodes to move the work off the carriage into operative relation to the electrodes, means operating in timed relation to the last named means to move the electrodes into and out of clamping engagement with the work, and means for closing and opening the circuit in timed relation to movement of the electrodes into and out of clamping engagement with the work.

2. In welding apparatus, a plurality of welders having electrodes movable into and out of clamping engagement with the work and arranged in an electric circuit, a work supporting carriage movable from a loading station to a position wherein the work is in registration with the electrodes of the welders, means operating in timed relation to movement of the carriage to position the work in registration with the electrodes to move the work off the carriage into operative relation to the electrodes, means operated by the last named means in timed relation to movement of the work into operative relation to the electrodes to effect movement of the electrodes into and out of clamping engagement with the work, and means responsive to operation of the electrode moving means to close and open the circuit to the electrodes in timed relation to movement of the electrodes into and out of clamping engagement with the work.

3. In welding apparatus, a plurality of welders having electrodes movable into and out of clamping engagement with the work and arranged in an electric circuit, a work supporting carriage movable from a loading station to a position wherein the work is in registration with the electrodes of the welders, means operated by the carriage in timed relation to movement of the latter to position the work in registration with the electrodes to lift the work off the carriage to a position in operative relation to the electrodes, and means operated by said lifting means to move the electrodes into and out of clamping engagement with the work and to close and open the electric circuit to the electrodes in timed relation to movement of the latter into and out of clamping engagement with the work.

4. In welding apparatus, a plurality of welders having electrodes movable into and out of clamping engagement with the work and arranged in an electric circuit, a work supporting carriage movable from a loading station to a position wherein the work is in registration with the electrodes of the welders, means operating in timed relation to movement of the carriage to position the work in registration with the electrodes to move the work off the carriage into operative relation to the electrodes, means operating in timed relation to movement of the work off the carriage to return the carriage to its loading station, and means operating in timed relation to movement of the work into operative relation to the welders to move the electrodes into and out of clamping engagement with the work and to close and open the electric circuit to the electrodes in timed relation to movement of the latter into and out of clamping engagement with the work.

5. In welding apparatus, a plurality of welders having electrodes movable into and out of clamping engagement with the work and arranged in an electric circuit, a work supporting carriage movable from a loading station to a position wherein the work is in registration with the electrodes of the welders, means operated by the carriage in timed relation to movement of the latter to position the work in registration with the electrodes to lift the work off the carriage to a position in operative relation to the electrodes, means operated by the lifting means to return the carriage to its loading station, and means also operated by the lifting means in timed relation to movement of the work into operative relation to the electrodes to move the electrodes into and out of clamping engagement with the work and to close and open the electric circuit to the electrodes in timed relation to movement of the latter into and out of clamping engagement with the work.

6. In welding apparatus, a plurality of welders having electrodes arranged in an electric circuit, a work supporting carriage movable from a loading station to a position wherein the work is in registration with the electrodes of the welders, means operating in timed relation to movement of the carriage to position the work in registration with the electrodes to move the work off the carriage into operative relation to the electrodes, means operating in timed relation to the last named means to close and open the electric circuit to the electrodes, and means operating in timed relation to opening of the electric circuit to the electrodes to return the work in supporting relation to the carriage.

7. In welding apparatus, a plurality of welders having electrodes movable into and out of clamping engagement with the work and arranged in an electric circuit, a work supporting carriage movable from a loading station to a position wherein the work is in registration with the electrodes of the welders, means operating in timed relation to movement of the carriage to position the work in registration with the electrodes to move the work off the carriage into operative relation to the electrodes, means operating in timed relation to movement of the work off the carriage to return the carriage to its loading station, means operating in timed relation to movement of the work into operative relation to the welders to move the electrodes into and out of clamping engagement with the work and to close and open the electric circuit to the electrodes in timed relation to movement of the latter into and out of clamping engagement with the work, and means operating in timed relation to movement of the electrodes out of clamping engagement with the work to return the work in supporting relation to the carriage.

8. In welding apparatus, a plurality of welders having electrodes movable into and out of clamping engagement with the work and arranged in an electric circuit, a work supporting carriage movable from a loading station to a position wherein the work is in registration with the electrodes of the welders, means operated by the carriage in timed relation to movement of the latter to position the work in registration with the electrodes to lift the work off the carriage to a position in operative relation to the electrodes, means operated by said lifting means to move the electrodes into and out of clamping engagement with the work and to close and open the electric circuit to the electrodes in timed relation to movement of the latter into and out of clamping engagement with the work, and means operating in timed relation to movement of the electrodes out of clamping engagement with the work to return the work to a position on the carriage.

9. In welding apparatus, a plurality of welders having electrodes movable into and out of clamping engagement with the work and arranged in an electric circuit, a work supporting carriage movable from a loading station to a position wherein the work is in registration with the electrodes of the welders, means operated by the carriage in timed relation to movement of the latter to position the work in registration with the electrodes to lift the work off the carriage to a position in operative relation to the electrodes, means operated by the lifting means to return the carriage to its loading station, means also operated by the lifting means in timed relation to movement of the work into operative relation to the electrodes to move the electrodes into and out of clamping engagement with the work and to close and open the electric circuit to the electrodes in timed relation to movement of the latter into and out of clamping engagement with the work, means operating in timed relation to movement of the electrodes out of clamping engagement with the work to return the work to a position on the carriage, and an unloading station upon which the completed work is deposited upon movement of the carriage to register the work located thereon at the loading station with the electrodes of the welders.

10. In welding apparatus, a plurality of welders having electrodes movable into and out of clamping engagement with the work and arranged in an electric circuit, a work supporting carriage movable from a loading station to a position wherein the work is in registration with the electrodes of the welders, means operating in timed relation to movement of the carriage to position the work in registration with the electrodes to move the work off the carriage into operative relation to the electrodes, means operating in timed relation to movement of the work off the carriage to return the carriage to its loading station, means operating in timed relation to movement of the work into operative relation to the welders to move the lectrodes into and out of clamping engagement with the work and to close and open the electric circuit to the electrodes in timed relation to movement of the latter into and out of clamping engagement with the work, means operating in timed relation to movement of the electrodes out of clamping engagement with the work to return the work in supporting relation to the carriage, and means responsive to movement of the carriage to register additional work with the electrodes of the welders to remove the completed work from the carriage.

11. In welding apparatus, a plurality of welders having electrodes movable into and out of clamping engagement with the work and arranged in an electric circuit, a reciprocable carriage having spaced work supporting portions, means for reciprocating the carriage to alternately move one of the portions between a loading station and a position in registration with the electrodes of the welders and to alternately move the other portion between an unloading station and a position in registration with the welders, means operating in timed relation to movement of the carriage in a direction to move the first work supporting portion from the loading station to a position in registration with the electrodes to lift the work from the carriage into operative relation with the electrodes, means operating in timed relation to the operation of the lifting means to move the electrodes into and out of clamping engagement with the work and to close and open the electric circuit to the electrodes in timed relation of movement of the latter into and out of clamping engagement with the work, means also operating in timed relation to the operation of the lifting means for moving the carriage in the opposite direction to return said first work supporting portion to the loading station, and means operating in timed relation to movement of the electrodes out of clamping engagement with the work to lower the work on the second named work supporting portion for movement by the latter to the unloading station upon movement of the carriage in the first mentioned direction to locate the new work in registration with the welders.

12. In welding apparatus, a plurality of welders having electrodes movable into and out of clamping engagement with the work and arranged in an electric circuit, a reciprocable carriage having spaced work supporting portions, means for reciprocating the carriage to alternately move one of the portions between a loading station and a position in registration with the electrodes of the welders and to alternately move the other portion between an unloading station and a position in registration with the welders, means operating in timed relation to movement of the carriage in a direction to move the first work supporting portion from the loading station to a position in registration with the electrodes to lift the work from the carriage into operative relation with the electrodes, means operated by the lifting means in timed relation to movement of the latter to locate the work in operative relation to the welders to move the electrodes into and out of clamping engagement with the work and to close and open the electric circuit to the electrodes in timed relation to movement of the latter into and out of engagement with the work, means also operated by the lifting means in timed relation to operation of the latter to lift the work from the carriage to move the latter in the opposite direction to return the first named work supporting portion to the loading station, means operating in timed relation to movement of the electrodes out of clamping engagement with the work to lower the work on the second named work supporting portion for movemtnt by the latter to the unloading station upon movement of the carriage in the first mentioned direction to locate the new work in registration with the welders, and means for removing the completed work from the second named portion of the carriage prior to return movement of the latter to locate the first portion at the loading station.

13. In welding apparatus, a plurality of welders having electrodes arranged in an electric circuit, work supporting means movable from a loading station to a position wherein the work is in registration with the electrodes of the welders, means operating in timed relation to movement of the work supporting means to position the work in registration with the electrodes to move the work off the work supporting means into operative relation to the electrodes, and means operated by the lifting means in timed relation to movement of the work off the supporting means into operative relation to the electrodes for closing and opening the circuit to the electrodes.

14. In welding apparatus, a plurality of welders having electrodes arranged in an electric circuit, work supporting means movable from a loading station to a position wherein the work is in registration with the electrodes of the welders, means operated by the work supporting means in timed relation to movement of the latter to position the work in registration with the electrodes to lift the work off the supporting means in operative relation to the electrodes, and means operated by the lifting means to close and open the electric circuit to the electrodes in timed relation to movement of the work into operative relation to said electrodes.

15. In welding apparatus, a plurality of welders having electrodes arranged in an electric circuit, work supporting means movable from a loading station to a position wherein the work is in registration with the electrodes of the welders, means operated by the work supporting means in timed relation to movement of the latter to position the work in registration with the electrodes to lift the work off the supporting means in operative relation to the electrodes, means operated by the lifting means to return the supporting means to said loading position, and means also operated by the lifting means to close and open the electric circuit to the electrodes in timed relation to movement of the work into operative relation to said electrodes.

16. In welding apparatus, a plurality of welders having electrodes arranged in an electric circuit, work supporting means movable from a loading station to a position wherein the work is in registration with the electrodes of the welders, means operating in timed relation to movement of the work supporting means to position the work in registration with the electrodes to move the work off the work supporting means into operative relation to the electrodes, means operating in timed relation to movement of the work off the supporting means to return the supporting means to its loading position, and means for closing and opening the circuit to the electrodes in timed relation to movement of the work off the supporting means into operative relation to the electrodes.

17. In welding apparatus, a plurality of welders having electrodes arranged in an electric circuit, work supporting means movable from a loading station to a position wherein the work is in registration with the electrodes of the welders, means operating in timed relation to movement of the work supporting means to position the work in registration with the electrodes to move the work off the work supporting means into operative relation to the electrodes, means operating in timed relation to movement of the work off the supporting means to return the supporting means to its loading position, means for closing and opening the circuit to the electrodes in timed relation to movement of the work off the supporting means into operative relation to the electrodes, means operating in timed relation to opening of the circuit to the electrodes to return the work to the supporting means, and means responsive to movement of the supporting means to register additional work thereon with the electrodes to remove the completed work from the supporting means.

18. In welding apparatus, a plurality of welders having electrodes arranged in an electric circuit, work supporting means movable from a loading station to a position wherein the work is in registration with the electrodes of the welders, means operating in timed relation to movement of the work supporting means to position the work in registration with the electrodes to move the work off the work supporting means into operative relation to the electrodes, means operating in timed relation to movement of the work off the supporting means to return the supporting means to its loading position, means for closing and opening the circuit to the electrodes in timed relation to movement of the work off the supporting means into operative relation to the electrodes, means operating in timed relation to opening of the circuit to the electrodes to return the work to the supporting means, and an unloading station located to receive the completed work upon movement of the supporting means to position additional work thereon in registration with the electrodes.

19. In welding apparatus, a plurality of welders having electrodes arranged in an electric circuit, a reciprocable carriage having spaced work supporting portions, means for reciprocating the carriage to alternately move one of the portions between a loading station and a position in registration with the electrodes of the welders and to alternately move the other portion between an unloading station and a position in registration with welders, means operating in timed relation to movement of the carriage in a direction to move the first work supporting portion from the loading station to a position in registration with the electrodes to lift the work from the carriage into operative relation with the electrodes, means operating in timed relation to the operation of the lifting means to close and open the electric circuit to the electrodes, means also operating in timed relation to the operation of the lifting means for moving the carriage in the opposite direction to return said first work supporting portion to the loading station, and means operating in timed relation to opening of the circuit to the electrodes to lower the work on the second named load supporting portion for movement by the latter to the unloading station upon movement of the carriage in the first mentioned direction to locate the new work in registration with the welders.

20. In welding apparatus, a plurality of welders having electrodes arranged in an electric circuit, a reciprocable carriage having spaced work supporting portions, means for reciprocating the carriage to alternately move one of the portions between a loading station and a position in registration with the electrodes of the welders and to alternately move the other portion between an unloading station and a position in registration with welders, means operated by the carriage in timed relation to movement of the carriage in a direction to move the first work supporting portion from the loading station to a position in registration with the electrodes to lift the work from the carriage into operative relation with the electrodes, means operated by the lifting means in timed relation to movement of the latter to locate the work in operative relation to the welders to close and open the electric circuit to the electrodes, means also operated by the lifting means in timed relation to operation of the latter to lift the work from the carriage to move the latter in the opposite direction to return the first named work supporting portion to the loading station, means operating in timed relation to opening of the circuit to the electrodes to lower the work on the second named load supporting portion for movement by the latter to the unloading station upon movement of the carriage in the first mentioned direction to locate the new work in registration with the welders, and means for removing the completed work from the second named portion of the carriage prior to return movement of the latter to locate the first portion at the loading station.

HENRY THOMAS PLATZ.